United States Patent [19]

Hardenbrook et al.

[11] Patent Number: 4,728,559
[45] Date of Patent: Mar. 1, 1988

[54] THERMOFORMED PLASTIC CONTAINERS WITH TRANSPARENT WINDOWS AND METHOD OF MAKING SAME

[75] Inventors: Scott B. Hardenbrook, Kent; Cynthia L. Desmond, Rochester, both of N.Y.

[73] Assignee: Eastman Kodak Company, Rochester, N.Y.

[21] Appl. No.: 74,175

[22] Filed: Jul. 16, 1987

[51] Int. Cl.⁴ .................................................. B32B 3/00
[52] U.S. Cl. ..................................... 428/159; 428/35; 428/170; 264/321
[58] Field of Search ............... 206/45.31; 428/35, 159, 428/160, 170; 264/321; 521/918

[56] References Cited

U.S. PATENT DOCUMENTS

| | | | |
|---|---|---|---|
| 3,432,380 | 3/1969 | Weber | 264/321 |
| 3,489,270 | 1/1970 | Bixler et al. | 206/45.31 |
| 3,832,428 | 8/1974 | Ryan | 428/46 |
| 3,958,053 | 5/1976 | Ryan | 428/159 |
| 4,230,759 | 10/1980 | Kauffman et al. | 428/159 |
| 4,473,665 | 9/1984 | Martini-Vuedensky et al. | 521/79 |

Primary Examiner—William J. Van Balen
Attorney, Agent, or Firm—Armin B. Pagel

[57] ABSTRACT

A container component is made from microcellular foam material, no more than approximately 30 mils thick, having a core of very small uniformity distributed cells to provide uniform opacity that is locally eliminated by the application of heat and pressure to create window areas at least 60% as thick as the surrounding material.

10 Claims, 5 Drawing Figures

THERMOFORMED PLASTIC CONTAINERS WITH TRANSPARENT WINDOWS AND METHOD OF MAKING SAME

BACKGROUND OF THE INVENTION

For many reasons, it is highly desirable to provide generally opaque thermoformed plastic containers with transparent window areas through which the packaged product can be viewed. As used herein, the term opaque refers to the external appearance of the material, which may actually be translucent, but which is not transparent to an optical image. In the case of conventional thermoformed containers made of extruded thermoplastic sheet material, the only way to provide such transparent windows is by coating the remainder of the plastic material with a layer of opaque paint or ink, e.g. by a silk screening operation. For added protection and to provide a very smooth and a glossy appearance, the opaque layer may, in turn, be overlaid with a coating of transparent material. This is obviously a relatively slow and expensive process but is nevertheless used for packaging products for which apparent packaging quality is an important sales consideration, e.g. cosmetics, jewelry, etc.

In recent years, foamed thermoplastic material has become increasingly important in the packaging industry because of its relatively low cost, its inherent opacity, its insulating qualities and its ability to protect packaged items from damage by absorbing impact. In many cases, foamed plastic container material is provided with an outer skin to make it still more attractive and resistant to being soiled, but such a skin is usually very thin and does not give the material the same appearance as extruded unfoamed pigmented or coated plastic. Because of its characteristic appearance and its widespread use with food products or other commodity type items, such packaging is not normally associated with items for which the package, sometimes referred to as a "jewel box" package, is intended to convey the impression of quality, prestige, distinctiveness, etc.

BRIEF DESCRIPTION OF THE PRIOR ART

Various prior art references disclose forming transparent windows in foamed plastic containers or the like made from inherently transparent plastic material which appears white and opaque in its foamed condition, by applying heat and pressure to defoam the material locally to restore it to its original transparent unfoamed condition. This process is disclosed, for example, in U.S. Pat. No. 3,432,380 issued on Mar. 11, 1969. More particularly, this patent discloses using heat and pressure to form windows in foamed plastic material made by means of a chemical foaming agent and specifically states that such windows will usually not have a thickness greater than 60% of the thickness of the foam prior to compression. The drawings of the patent from which thicknesses can be estimated show windows about ¼ (FIG. 1) to ⅓ (FIG. 4) the thickness of the surrounding skinned material. Because the window forming operation restores the foamed plastic material substantially to its unfoamed density, the ratio of the thickness of the window to the thickness of the foamed material, including its skin, is substantially the same as the ratio of the density of the foamed material, including its skin, to the density of the unfoamed material. Only two examples in this patent specifically identify the density of the foamed plastic material, such examples being directed to embodiments which are not illustrated in the drawings. In these two examples, the recited densities of the foamed cores are 32 lbs/cu. foot for polystyrene and 37 lbs/cu, foot for high density polyethylene. Assuming 66 and 60 lbs/cu. foot to represent the respective densities of these materials in unfoamed condition, the recited skin and foam thickness in these examples indicate that the windows are respectively about 57 and 65% as thick as the foamed and skinned material.

In broadly describing various materials, the aforesaid patent further indicates that the foamed material can have a density as high as 85% that of the unfoamed polymer and that the usual thickness of the skinned foam sheet can be as thin as 10 mils. However, despite many attempts, we have been unsuccessful in making, by means of a chemical foaming agent, any thermoplastic sheet material that effectively simulates the high quality appearance of transparent unfoamed sheet material that has been printed, silk screened or otherwise coated with a pigmented ink or the like to define the localized transparent windows. This is particularly evident in relatively thin chemically foamed sheets, e.g. 30 mils or less, which have the somewhat mottled, pebbled or grainy appearance of foam regardless of attempts to reduce cell size. Furthermore, such thin sheet material made of a transparent plastic does not appear to be truly white but, rather, somewhat gray or cream colored and true whiteness can be achieved in such materials only by adding titanium dioxide or some other pigment, which of course prevents the thermoformed windows from having the same transparency as would be the case in the absence of such material. Increasing the density of such thin chemically foamed material does not enhance its appearance but increases its mottled or grainy quality. Also, any such chemical foaming process tends to reduce the physical strength and other structural characteristics of the sheet material. In summary, then, the process described in the foregoing patent may be suitable for producing relatively thick foamed plastic containers with integral windows but cannot provide containers which simulate effectively the appearance of windowed containers made from relatively thin unfoamed material.

SUMMARY OF THE INVENTION

The present invention involves providing plastic containers or the like with windows by a similar process to that described above but is directed to the use of a fundamentally different type of foamed plastic material and also involves different objectives and considerations.

Rather than being directed to providing windows in a product intended to enjoy the advantages attributable to conventional foamed plastic material, an object of the present invention is to make containers or the like from thermoplastic material, no more than approximately 30 mils thick, which has a relatively thin core of very small uniformly distributed cells to provide uniform opacity that can be locally eliminated to restore the material to substantiate its original degree of transparency, with the resulting windows being at least 60% as thick as the surrounding material. We have found that this objective can be achieved by using a plastic material herein referred to as microcellular foam, which is made by saturating a plastic material under pressure with a gas, allowing the gas to diffuse from surface regions of the material and then heating the material to produce a foamed core with unfoamed skin layers. Although the same term is sometimes used more broadly, it should be understood that the term microcellular as used herein characterizes a plastic material made by the foregoing process.

This microcellular foamed material and methods for its production are described more fully in U.S. Pat. No. 4,473,665 issued on Sept. 12, 1984 and assigned to Massachusetts Institute of Technology and in pending U.S. patent application Ser. No. 006,830 entitled METHOD AND APPARATUS FOR PRODUCING MICROCELLULAR FOAMED PLASTIC MATERIAL WITH SMOOTH INTEGRAL SKIN, filed on Jan. 27, 1987. By this process, the skin surfaces of the material are as smooth and uniform as they were when originally extruded and the cells or voids substantially have a size range from 2 to 25 microns and are very uniformly distributed. This produces much greater and more uniform light dispersion than can be achieved with a chemically foamed cell structure of the same relative thinness. This gives the resulting material an appearance that is difficult if not impossible to distinguish from a pigment coating by ordinary visual observation and that, in the case of normally transparent plastic material, has a truly clean white appearance. The reason for this distinct difference in cellular structure is not entirely understood but presumably results from the fact that the nucleation sites of the individual cells are determined by molecular structure in the so-called microcellular foam, rather than by the physical distribution of physical particles, as in the case of chemical foaming processes; thereby allowing the nucleation of a much larger population of cells in the former material than in the latter.

The aforementioned fundamental difference between microcellular foam made by the gas saturation process and foam produced by chemical or other means is also reflected by our discovery that windows cannot be produced satisfactorily in the former material merely by using the temperature and pressure parameters set forth in the previously discussed patent or in other patent references to similar processes, e.g. U.S. Pats. Nos. 3,832,428, 3,958,053 and 3,489,270, issued respectively on Aug. 27, 1974, May 18, 1976 and Jan. 13, 1970. Specific temperature and pressure parameters given in these references are discussed below in comparison with the corresponding but substantially different parameters which we have found to be necessary for carrying out an invention.

DETAILED DESCRIPTION OF THE INVENTION

Figure 1:
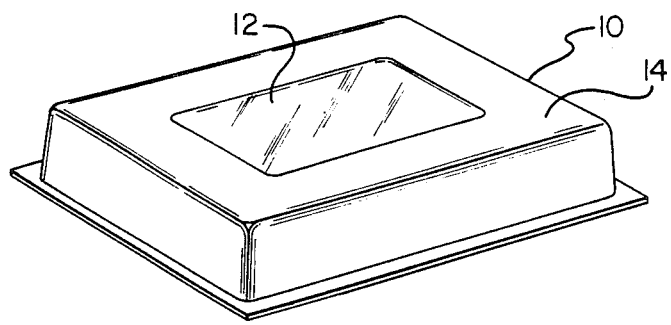
FIG. 1 is a perspective illustration of a packaging component made of thermoformed microcellular foamed plastic material provided with an integral transparent window in accordance with the present invention.
Figure 2:
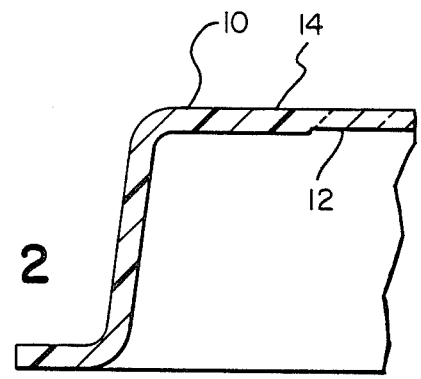
FIG. 2 is an enlarged partial cross sectional view of the illustrative container element depicted in FIG. 1.
Figure 5:
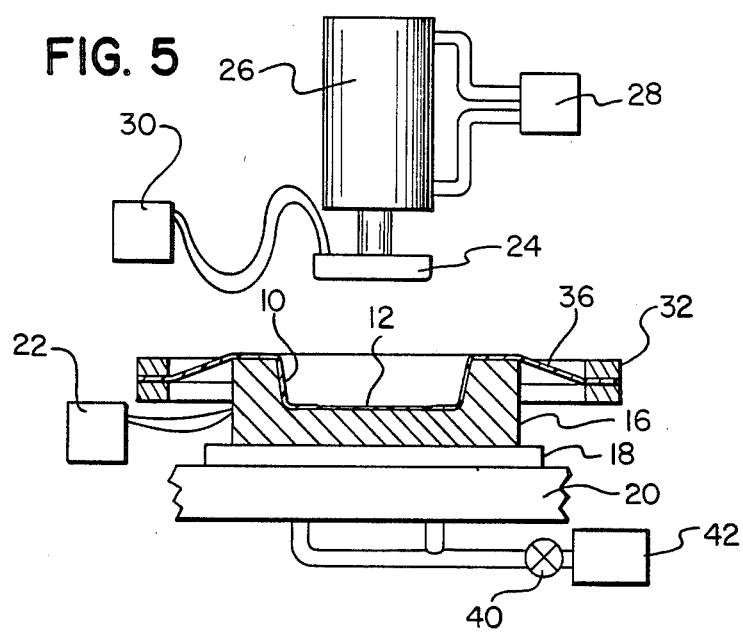
FIG. 5 corresponds to FIGS. 3 and 4 but depicts the apparatus after the container has been formed and the window has been produced but before it is removed from the mold.

As shown in FIGS. 1 and 5 of the accompanying drawings, an illustrative packaging component 10, which might be used as a container lid or the like, comprises a box-like one piece thermoformed element made of microcellular foamed plastic material and provided with a transparent window 12 in its top wall 14. As best shown in FIG. 2, the window 12 is at least 60% as thick as the surrounding foam material and is the only portion of the packaging component that is transparent. As previously mentioned, because of its smooth surface and the uniform distribution of its very small cells, foamed portions of the packaging component have the appearance of pigmented or coated unfoamed material rather than that of conventional foamed material.

Figure 3:
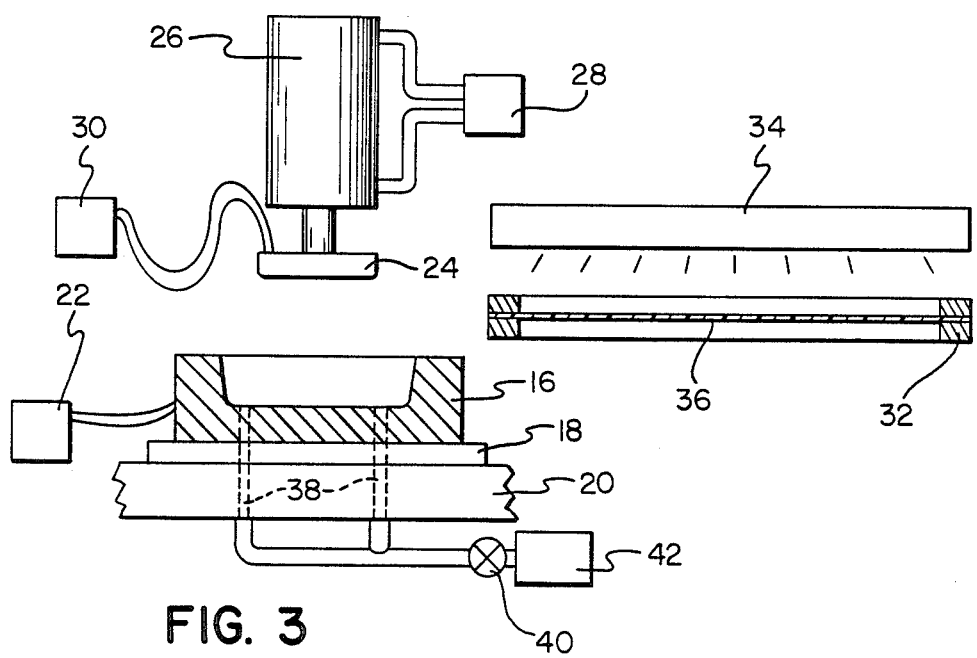
FIG. 3 is a schematic illustration of an apparatus for producing the illustrative container element shown in FIG. 1, depicting the apparatus in a stage of operation during which a sheet of plastic material is being heated prior to thermoforming and windowing.
Figure 4:
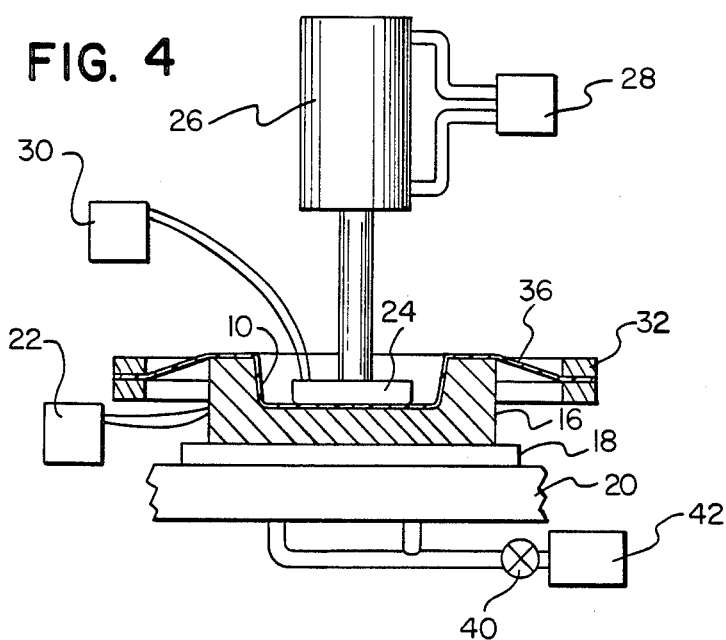
FIG. 4 corresponds to FIG. 3 but depicts the apparatus in the stage of operation in which the sheet has been formed to the shape of the container and the transparent window area is being produced.

The apparatus depicted schematically in FIGS. 3 through 5 comprises a conventional type of open thermoforming mold 16 attached to a base plate 18 and insulated therefrom by an insulating member 20. The mold is typically made of aluminum and is provided with means for accurately controlling its temperature. For example, such means may comprise internal passages through which a temperature controlled fluid can be circulated from a temperature controlled unit 22, which may be regulated by thermocouples or the like, not shown, that monitor the mold temperature. Above the mold, a stamp or die 24 is mounted for vertical reciprocal movement, for example, by a hydraulic cylinder 26 connected to a hydraulic pump unit 28, so that the die can be moved between the positions shown in FIGS. 3 and 4. The stamp or die 24 is likewise provided with internal heating means connected to a temperature control unit 30 and regulated by appropriate heat sensing devices, not shown. Because the die 24 forms the transparent window area, its lower surface is highly polished, as is the confronting surface of the mold. As illustrated, the surface of the mold that forms the window is coplanar with the surrounding mold surface so that the window is likewise coplanar with the outer surface of wall 12 and somewhat recessed relative to the inner wall surface. However, the mold surface that defines the window can be slightly raised, if desired, to recess the window slightly below the surrounding outer surface of wall 14.

A moveable frame 32, is initially located beneath a radiant heater 39 and supports a sheet of microcellular foamed material 36 below the radiant heater to bring it to an appropriate temperature for the thermoforming and window forming operation. An optical pyrometer, or the like, not shown, monitors the temperature of the plastic sheet and controls the duration of the heating process.

After the plastic sheet has been brought to its appropriate temperature by the radiant heater, frame 32 is moved laterally to locate it between the mold 16 and the die 24 and is then lowered to the position shown in FIG. 4 so that the heated sheet is draped across the mold. The mold is then evacuated by connecting internal ports 38 through valve 40 to a vacuum pump or the like, 42, so that the sheet is drawn into intimate contact with the mold, as is well known in the thermoforming art. Immediately following the thermoforming operation the die 24 is forced downwardly by cylinder 26 to the position shown in FIG. 4 and compresses the corresponding portion of the thermoformed sheet under sufficient pressure to de-foam the corresponding portion of the material and thereby produce the desired window. Alternatively, the die can be moved downwardly prior to or concurrently with the evacuation of the mold to assist that operation in the manner of a so-called "plug". However, if the die is incorporated in such a "plug", insulation means may be necessary between the die and the remainder of the "plug" so that the die and "plug" can be maintained selectively at different respective temperatures. After the thermoforming and windowing operations are completed, the die is raised to the position shown in FIG. 5, leaving the finished container in the mold. Thereupon, the frame is moved again to remove the finished container from the mold and a conventional cutting operation removes excess material around its periphery to complete the component. Alternatively, an appropriate cutting die can be employed to wholly or partially remove the excess material while the container element is still in the mold, as is well known in the prior art.

Although the illustrative apparatus processes individual sheets of plastic material supported in a frame, it should be apparent that the same device can be adapted to handle roll material which is moved incrementally to bring successive areas into heating and foaming position and that the material can be heated from both faces rather than merely from one face. Similarly, although the depicted apparatus illustrates thermoforming simply by means of vacuum, it is also well known in the art to apply air pressure to the upper surface of the sheet to force it into the mold, either instead of or in conjunction with the use of vacuum applied to the lower sheet surface, and the illustrated apparatus could readily be adapted to function in this manner.

Although the above-discussed apparatus generally resembles that known in the prior art, the heating and pressure parameters involved in using such equipment for thermoforming and/or windowing with microcellular foam material are very different and generally much more critical than those associated with other types of foamed plastic materials. For example, conventional polystyrene foam sheet material expands quite significantly when it is heated prior to thermoforming and the strength of the material is reduced as its temperature increases. When the sheet surface temperature of such conventional material exceeds about 225°–250° F. during such heating, the cells begin to rupture and collapse, which is evident from sheet surface appearance and from the reduction in the rate of expansion. Because of this expansion characteristic of conventional polystyrene foam material, it is often formed between mating dies which compress both faces of the material and provide relatively smooth surfaces notwithstanding cell rupture, in which case the sheet temperature may be in the range in which cell rupture occurs without serious consequences to the final product. Microcellular foam, however, exhibits much less expansion in response to heating and, in accordance with the present invention, is thermoformed by vacuum and/or positive gas pressure in a die that contacts only one face of the material, except in the window areas. This process is not only much less expensive than mating die techniques, both in terms of die and overall equipment costs, but also provides the previously discussed high-quality appearance provided by the use of microcellular foam material. Accordingly, in comparing the thermoforming temperatures of conventional foamed material with those of microcellular foam material it should be understood that the temperature parameters are not analogous for the two different types of materials and thermoforming operations. As opposed to the above-mentioned temperatures of 225°–250° F. conventionally employed to thermoform polystyrene foam material in mating dies, we have discovered that microcellular polystyrene foam material of about 15–30 mils thick should have a sheet temperature in the range of about 275°–300° F., as measured with an optical surface temperature pyrometer. Further details regarding thermoforming of conventional polystyrene material are described in an article entitled POLYSTYRENE FOAM SHEET EXPANSION DURING HEATING, by J. L. Throne, published in the Annual Technical Conference Of The Society of Plastics Engineers '85, pages 1328–1333.

It has also been observed with regard to thermoforming conventional foam material that the surface temperature at which cell rupture first occurs is somewhat dependent on the rate of heating; i.e., the faster the temperature of the sheet is raised, the lower is the measured surface temperature at which cell rupture is detected. For example, the above-cited article notes that, in the described experiment, cell collapse began as the sheet surface temperature exceeded about 225°–250° F. and was most apparent early on when the radiant heater temperature was in excess of about 800° F. This factor, however, is apparently not particularly critical when thermoforming conventional foam material and, when matching dies are used, can probably be ignored completely. In the case of microcellular foam material, however, we have found that the heating rate is quite important. For example, with polystyrene microcellular foam material of approximately 15–30 mils thickness, our experiments have shown that if the surface temperature of the material is raised to approximately 280°–285° F. by a radiant heater, unacceptable cell deterioration will result if the time required to bring the surface temperature of the sheet to such a temperature is less than approximately 7 seconds or longer than approximately 11 seconds. Similarly, if the surface temperature of the sheet is raised to approximately 300° F., the heating must occur within a time range of from approximately 8 to approximately 14 seconds to avoid unacceptable cell damage. These heating time ranges vary somewhat depending on the thickness of the material and on whether it is heated from one side or both sides, but illustrate generally the fact that the microcellular foam material is much more sensitive to heating time than is conventional foam and that the range of acceptable heating time not only has a minimum limit but also a maximum limit, which is not mentioned in any literature of which we are aware.

The temperatures involved in recompressing microcellular foam material to produce transparent windows is also quite different from that cited in U.S. Pat. No. 3,432,380, which suggests a temperature range for conventional molded polystyrene foam of from 190°–230° F. Our experiments have shown, however, that satisfactory windows cannot be formed in microcellular polystyrene foam of approximately 15–30 mils thickness except when the sheet surface temperature is in a range of approximately 275°–300° F. Additionally, we have discovered that the mold temperature should be in a range of approximately 150°–180° F. and that the stamping die, which actually forms the windowed area, is preferably in a temperature range of approximately 85°–250° F.

U.S. Pat. No. 3,832,428 lists similar forming temperatures of about 285° F. but die temperatures of about 335°–355° F., and, notwithstanding the die temperature differences, it should be recognized that these temperatures are applicable to methyl methacrylate polymers, which are not analogous to the polystyrene material used in our experiments.

The pressure applied to the window forming die is referred to very broadly in the previously discussed U.S. Pat. No. 3,432,380 as being within a range of from 100 psi to 10,000 psi but is specified as being preferably within the range of 900–1500 psi. Our experiments have shown, however, that the die pressure must be at least 2,000 psi and preferably on the order of 3,000 psi in order to form acceptable windows. These unit area pressures tend to increase with the area of the window being formed but the critical consideration is that in experiments in which generally rectangular windows of approximately 0.5 and 1.2 square inches were produced, best results were achieved at a pressure of about 3000 psi and it proved impossible to produce a satisfactory window at a pressure of less than approximately 2,000 psi.

U.S. Pat. No. 3,958,053 likewise discloses forming windows in foamed methyl methacrylate material at a temperature in the range of approximately 300°–350° F. and with pressure of 250 psi. In addition to the temperature and pressure differences, this disclosure likewise relates to non-analogous methyl methacrylate material which was further altered by the addition of water to the thermoplastic polymer.

British Patent Specification No. 1,181,604 (U.S. Pat. No. 3,489,270) refers to forming transparent windows in cellular foam material by heating the lower die to a temperature of 250° F. and applying a pressure of 18,000 psi. This disclosure does not specify, however, the particular type of plastic material to which these parameters relate and our experience indicates clearly that they would not result in an acceptable window in the type of microcellular foam material to which our invention relates. It should also be noted that, as previously mentioned, none of the references just discussed makes any reference to the rate at which the material is raised to its optimum forming temperature.

To summarize the foregoing, we have discovered that very satisfactory windows can be formed by re-compressing relatively thin polystyrene microcellular foam material by using a mold temperature of approximately 150°–180° F., a sheet temperature of approximately 275°–300° F., a rate of sheet heating within a predetermined range within which cell rupture is substantially avoided, a mold temperature of between approximately 150°–180° F. and a stamp die temperature of at least 90° F. at a pressure of at least 2,000 psi. If any of these conditions are significantly lowered no satisfactory window is produced and if any of the temperature parameters are significantly increased the resulting windows are likely to be wrinkled, distorted or not well defined. If the sheet material is heated above approximately 300° F., bubbles and blisters tends to appear and destroy the acceptable appearance of the material.

Although the invention can be employed to provide windows in microcellular foam material independently of or in the absence of a thermoforming operation, it should be noted that the window forming temperatures are compatible with the required thermoforming temperatures and thus allow the thermoforming and windowing to be combined in a single cost effective operation.

The invention has been described with reference to illustrative embodiments thereof but it will be understood that variations and modifications can be made within the spirit and scope of the invention, which is defined in the appended claims.

We claim:

1. A container component made from substantially opaque microcellular foamed sheet plastic material, said component including a transparent window formed by heating and compressing the corresponding region of said material to eliminate foam in that region, said window being at least 60% as thick as said material in its foamed condition.

2. The invention according to claim 1 in which said microcellular foamed sheet plastic material is less than approximately 30 mils thick.

3. The invention defined by claim 1 in which said material is polystyrene.

4. The invention defined by claim 1 in which said component is thermoformed to a generally box-like configuration.

5. The method of producing a transparent window in a component made from microcellular foamed sheet plastic material by compressing a region of said material corresponding to said window between confronting smooth surfaces of a mold and a die, said method comprising the steps of:
    (a) heating the material to a surface temperature in the range of approximately 275°–300° F.
    (b) maintaining the die at a temperature in the range of approximately 85°–250° F.;
    (c) maintaining the mold at a temperature in the range of approximately 150°–180° F.; and
    (d) urging said die toward said mold with a pressure of at least 2000 pounds per square inch of window area.

6. The method according to claim 5 in which said material is compressed by said die to a thickness at least 60% that of said foamed sheet material.

7. The method according to claim 5 in which the step of heating the material is accomplished by radiant heat of an intensity such that the resulting rate of heating produces a surface temperature in the range of approximately 275°–300° F. within a time range in which said heating produces insignificant cell rupture in said material.

8. The method according to claim 7 in which said material is polystyrene of a thickness less than approximately 30 mils.

9. The invention according to claim 7 in which said rate of heating produces a surface temperature in the range of approximately 275°–300° F. within a time range of approximately 7–14 seconds.

10. The method according to claim 5 including the step of thermoforming said sheet material against said mold beyond said region contemporaneously with the production of said transparent window to produce a component of box-like configuration.

* * * * *